United States Patent
Kim et al.

(10) Patent No.: US 10,522,849 B2
(45) Date of Patent: Dec. 31, 2019

(54) ELECTROCHEMICAL CELL COMPRISING CHANNEL-TYPE FLOWABLE ELECTRODE UNITS

(71) Applicant: KOREA INSTITUTE OF ENERGY RESEARCH, Daejeon (KR)

(72) Inventors: Dong-Kook Kim, Daejeon (KR); Sung-Il Jeon, Daejeon (KR); Ko-Yeon Choo, Daejeon (KR); Younghyun Cho, Asan-si (KR); Jeong-Gu Yeo, Daejeon (KR); Jong-Soo Park, Daejeon (KR); SeungCheol Yang, Jeju-si (KR); Ji Yeon Choi, Seoul (KR); Hong Ran Park, Gwangju (KR); Ki Sook Lee, Chungju-si (KR); Young Jik Youn, Daejeon (KR); Jung Hyun Lee, Daegu (KR); Hee-Yeon Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 96 days.

(21) Appl. No.: 15/694,159

(22) Filed: Sep. 1, 2017

(65) Prior Publication Data

US 2018/0123145 A1   May 3, 2018

Related U.S. Application Data

(63) Continuation-in-part of application No. PCT/KR2016/002110, filed on Mar. 3, 2016.

(30) Foreign Application Priority Data

Mar. 4, 2015 (KR) .................. 10-2015-0030566
Sep. 6, 2016 (KR) .................. 10-2016-0114568

(51) Int. Cl.
| | |
|---|---|
| H01M 8/02 | (2016.01) |
| H01M 8/0258 | (2016.01) |
| H01M 8/18 | (2006.01) |
| C02F 1/46 | (2006.01) |
| C02F 1/469 | (2006.01) |
| C02F 1/461 | (2006.01) |

(52) U.S. Cl.
CPC ......... *H01M 8/0258* (2013.01); *C02F 1/4604* (2013.01); *C02F 1/4695* (2013.01);
(Continued)

(58) Field of Classification Search
CPC ........ H01M 8/02; H01M 8/0258; H01M 8/18; H01M 4/13; H01M 4/58
See application file for complete search history.

(56) References Cited

U.S. PATENT DOCUMENTS 8,343,646 B1 * 1/2013 Wilkins ............... H01M 8/188
429/105
2009/0075153 A1   3/2009 Son et al.
(Continued)

FOREIGN PATENT DOCUMENTS

EP      3045431 A1    7/2016
JP   2009-98027 A    5/2009
(Continued)

OTHER PUBLICATIONS

Machine Translation of: KR-10-1353961 B1, Yoon et al., dated Jan. 23, 2014.*
(Continued)

*Primary Examiner* — Kenneth J Douyette
(74) *Attorney, Agent, or Firm* — Birch, Stewart, Kolasch & Birch, LLP

(57) ABSTRACT

The present invention relates to an electrochemical cell having a channel-type flow-electrode unit.
(Continued)

US 10,522,849 B2
Page 2

The channel-type flow-electrode structure according to the present invention, which has at least two channel-type flow-electrode units, can significantly reduce manufacturing costs and installation space by reducing the number of parts while extending the electrode capacity to be suitable for large-scale plants for electricity generation, energy storage, desalination, etc. In addition, the channel-type flow-electrode structure can be applied not only to a capacitive flow-electrode device and/or a redox flow battery device, but also to all of the devices for electricity generation, energy storage, and desalination while moving ions or protons.

14 Claims, 14 Drawing Sheets
(5 of 14 Drawing Sheet(s) Filed in Color)

(52) U.S. Cl.
CPC .............. *H01M 8/18* (2013.01); *H01M 8/188* (2013.01); *C02F 1/46109* (2013.01); *C02F 2001/46171* (2013.01); *Y02A 20/134* (2018.01); *Y02E 60/528* (2013.01)

(56) References Cited

U.S. PATENT DOCUMENTS

2012/0021280 A1  1/2012  Katase et al.
2012/0273359 A1  11/2012  Suss et al.
2013/0209916 A1  8/2013  Kim et al.

FOREIGN PATENT DOCUMENTS

| | | |
|---|---|---|
| JP | 2011-151279 A | 8/2011 |
| KR | 10-2009-0028021 A | 3/2009 |
| KR | 10-2012-0114201 A | 10/2012 |
| KR | 10-1210525 B1 | 12/2012 |
| KR | 10-1221562 B1 | 1/2013 |
| KR | 10-1233295 B1 | 2/2013 |
| KR | 10-1318331 B1 | 10/2013 |
| KR | 10-2013-0134959 A | 12/2013 |
| KR | 10-1353961 B1 | 1/2014 |
| KR | 10-2015-0127828 A | 11/2015 |
| KR | 10-2016-0032949 A | 3/2016 |

OTHER PUBLICATIONS

Cho et al., "A novel three-dimensional desalination system utilizing honeycomb-shaped lattice structures for flow-electrode capacitive deionization" The Royal Society of Chemistry 2017, Energy & Environmental Science, 2017, 10, pp. 1746-1750.

* cited by examiner

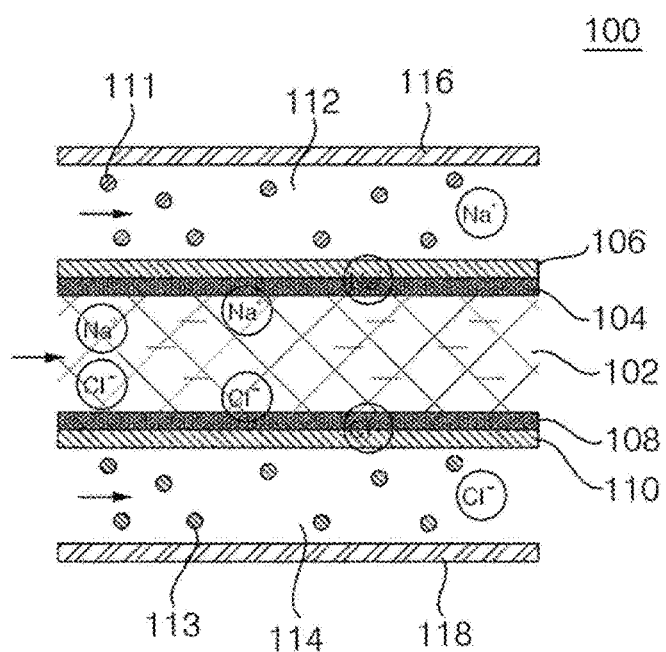
[Fig. 1]

[Fig. 2]
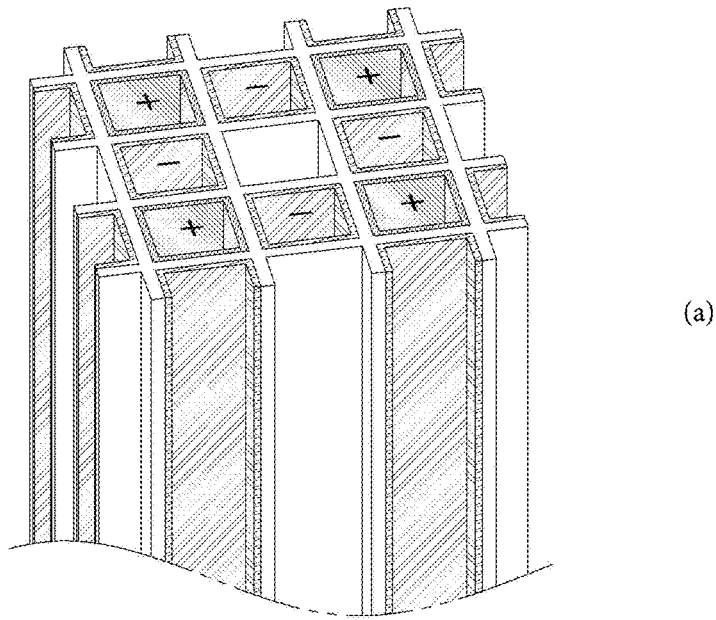
(a)
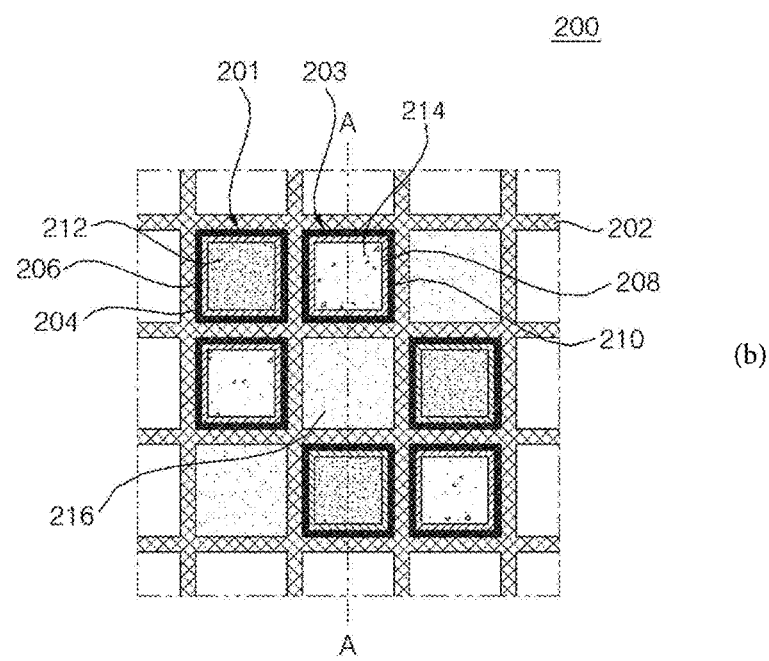
(b)

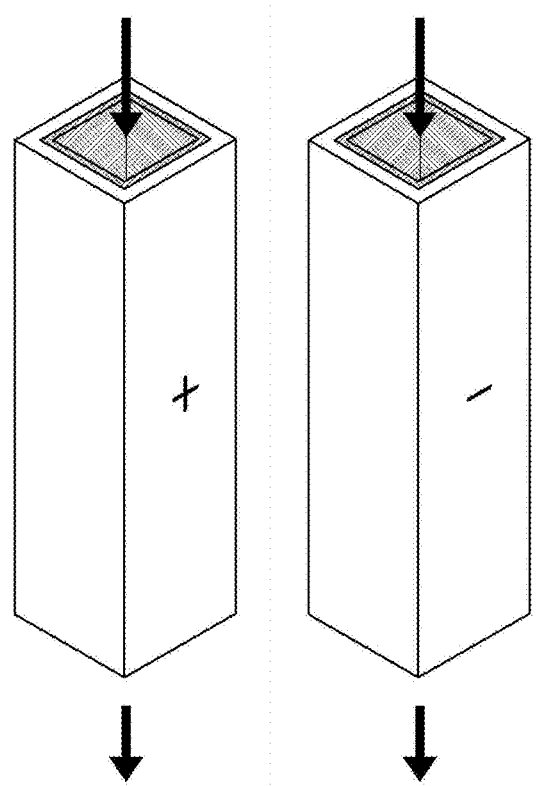
[Fig. 3]

[Fig. 4]
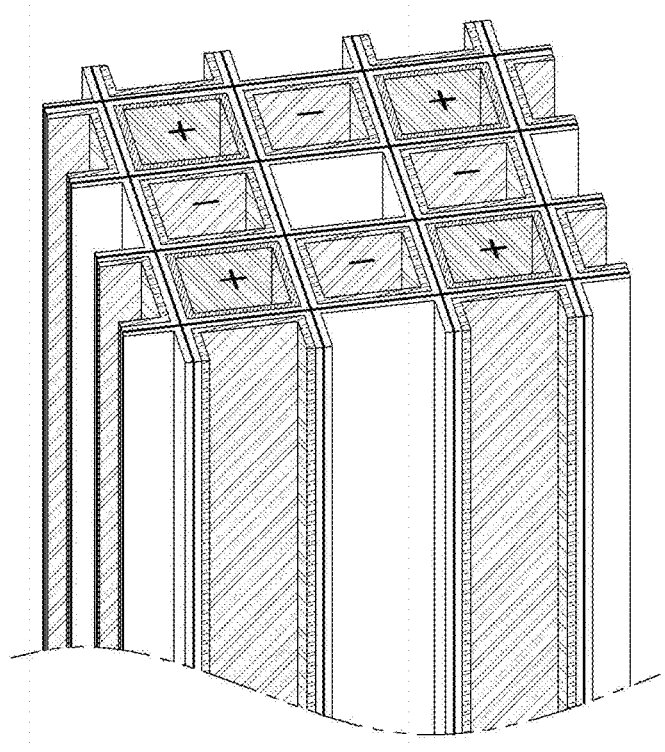

[Fig.5a]
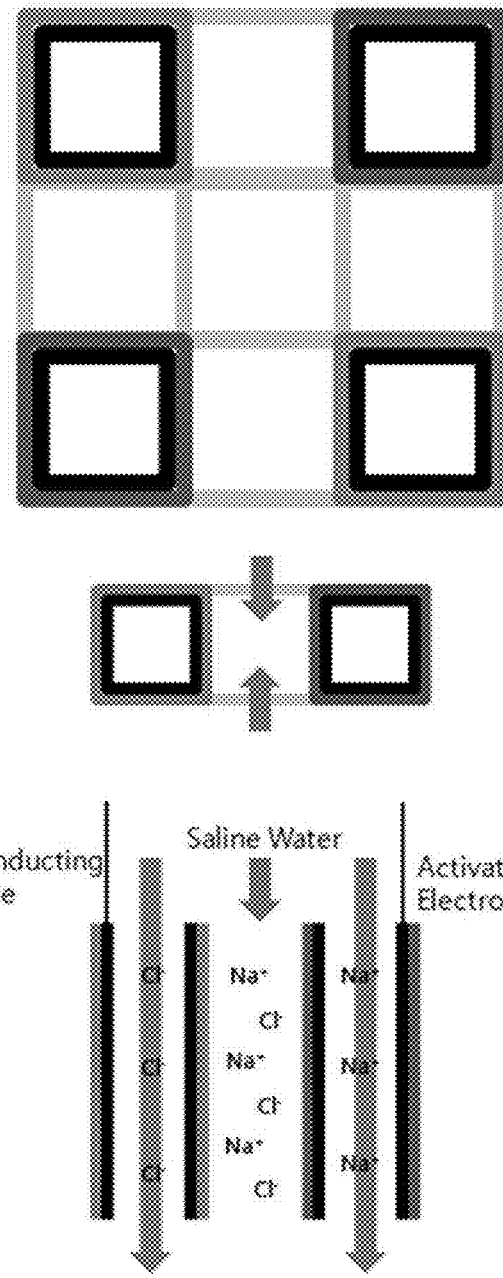

[Fig.5b]
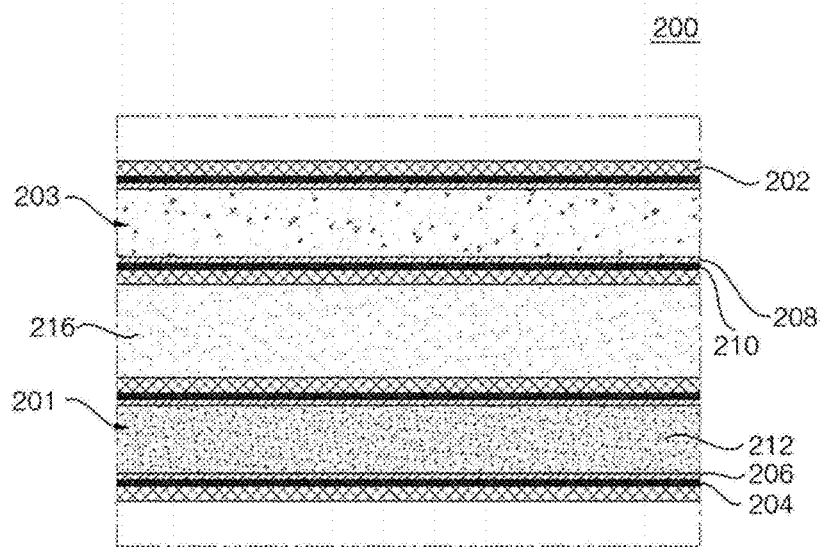
[Fig.6]
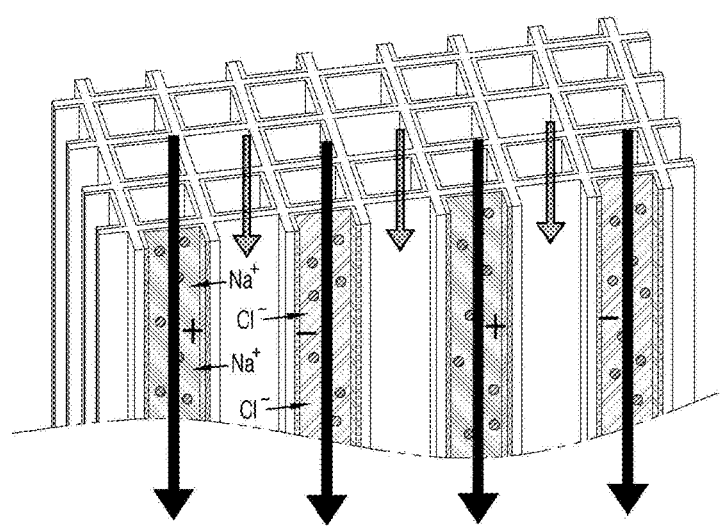

[Fig.7]
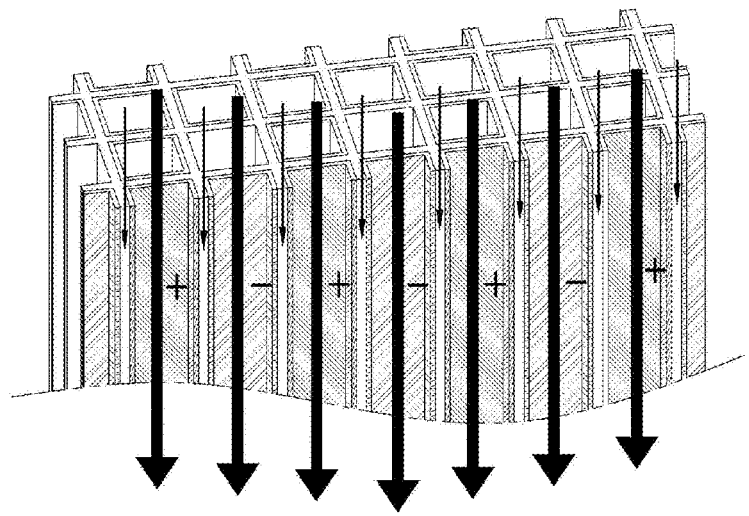
[Fig.8]
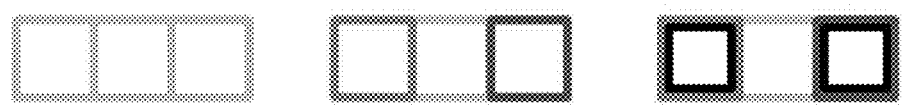
Microporous Honeycomb Structure → Ion-Exchange Membrane Coating → Graphene Coating
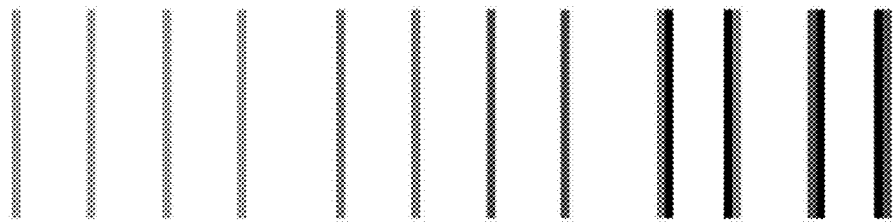

[Fig.9]
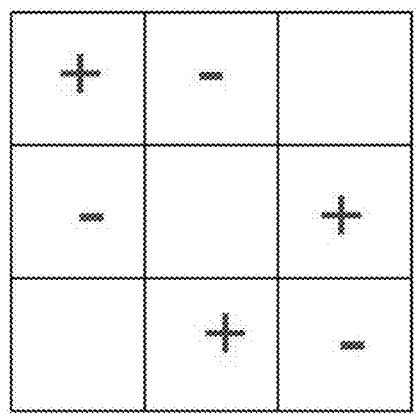
[Fig.10]
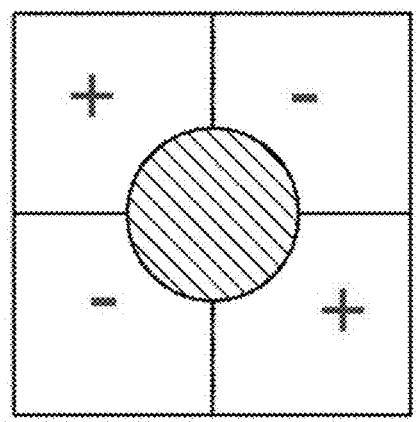

[Fig.11]
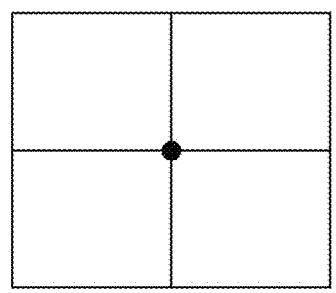
(a)
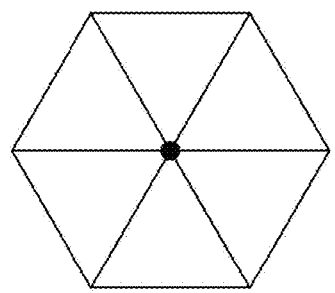
(b)
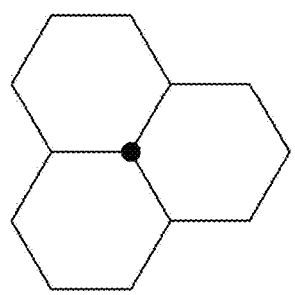
(c)
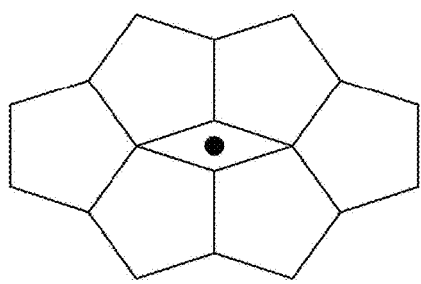
(d)

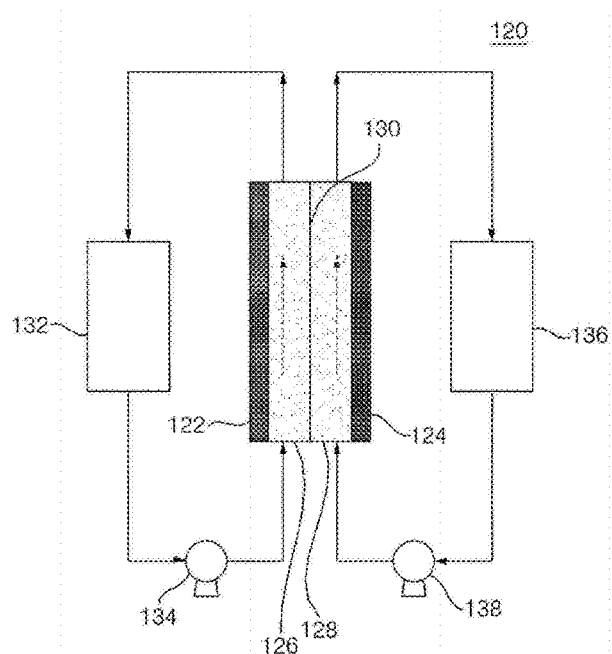
[Fig.12]

[Fig.13]
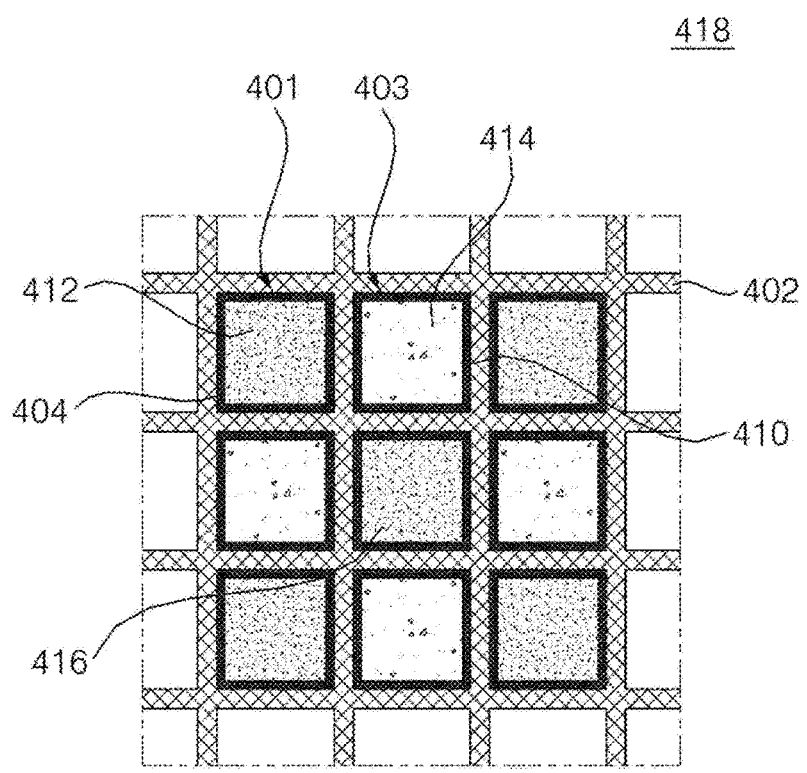

[Fig.14]
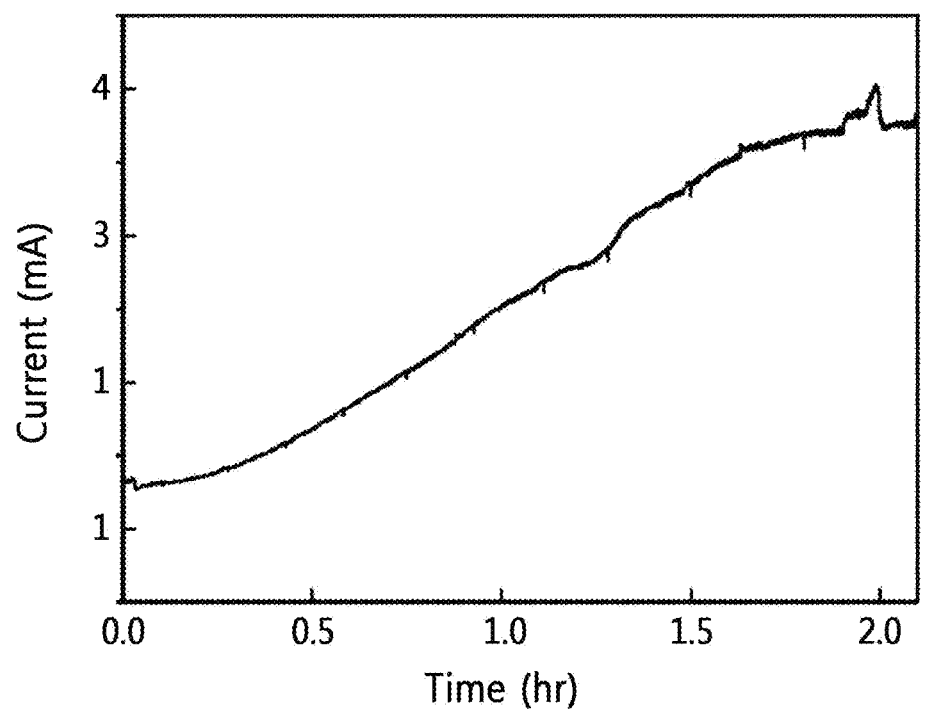

[Fig.15]
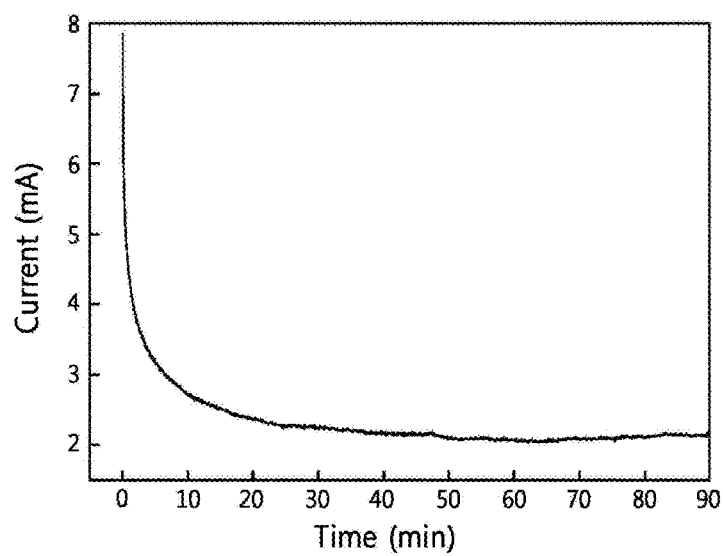
[Fig.16]
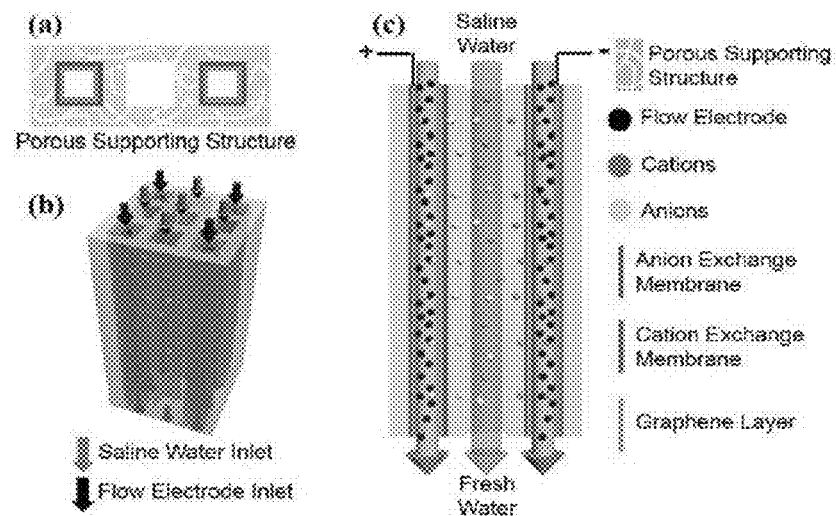

[Fig.17]
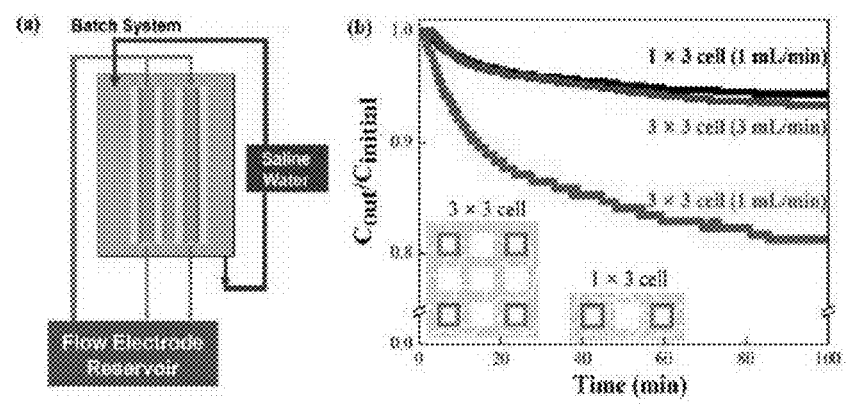

ELECTROCHEMICAL CELL COMPRISING CHANNEL-TYPE FLOWABLE ELECTRODE UNITS

CROSS REFERENCE TO RELATED APPLICATIONS

This application is a Continuation-in-Part of PCT International Application No. PCT/KR2016/002110, filed on Mar. 3, 2016,which claims priority under 35 U.S.C. 119(a) to Patent Application No. 10-2015- 0030566, filed in the Republic of Korea on Mar. 4, 2015, and Patent Application No. 10-2016-0114568, filed in the Republic of Korea on Sep. 6, 2016, all of which are hereby expressly incorporated by reference into the present application.

TECHNICAL FIELD

The present invention relates to an electrochemical cell comprising channel-type flow-electrode unit structures.

BACKGROUND ART

In recent years, many countries have devoted great efforts to developing clean energy alternatives in order to solve the problems of atmospheric environmental pollution and global warming. In particular, marine salinity gradient power generation recently has received much attention.

At the same time, the development of large-capacity electric power storage technology capable of storing electric energy generated by various alternative energies has been raised as a key point in the foundation of the green industry of the future. Most such future technologies for power storage are based on the principles of ion absorption (charge) and desorption (discharge) such as Li-ion batteries or super capacitors, and therefore, countries over the world are proceeding with major research and development efforts to accomplish high-efficiency densification and capacity extension by improving the charge-discharge characteristics of materials and parts.

Meanwhile, such principles have also recently been employed in water treatment applications including treatment of purified water or waste water, and sea water desalination, etc., whereby water is treated with an energy cost which is very decreased compared to the existing methods of evaporation or reverse-osmosis (RO); that is, a capacitive deionization (CDI) process is now under development.

For a power storage and water treatment system using the identical principles as described above, the most significant problem is the high cost of equipment as well as reduction of efficiency in the extension of capacity. In other words, due to an increase in the surface area of electrodes for upscaling, and irregularities in the electrical field distribution of the electrode, limited amounts of active materials in thin film electrodes coated on current collectors, a decrease in the contact area between the active material and electrolyte by binders during coating, decrease in charge-discharge efficiency, and so forth, the number of unit cells must be stacked, thereby causing high equipment costs, and specifically, a capacitive deionization (CDI) process encounters the problem of increasing operational costs due to the loss of water (electrolyte) pressure in the stack flow.

In order to solve the above problem, the present applicant has developed a capacitive flow-electrode device (Korean Patent No. 10-1233295), and used the same for development (Korean Patent No. 10-1318331), energy storage (Korean Patent No. 10-1210525), and water treatment (Korean Patent No. 10-1221562).

Although it is possible to supply electrodes having an infinite electrode capacity to unit cells by the flow-electrode proposed in the inventions above, existing technologies such as apparatuses including a redox flow battery, etc., which use the flow-electrode, are required to increase electrode area or to be stacked to provide a large capacity. However, in existing technologies, constitutional unit elements including positive and negative electrode collectors are infinitely stacked.

As a result, the stacking of the unit cells not only cause a greatly increased volume, but also has a problem in that the number of components increases due to a variety of flow channels, thereby increasing the costs of manufacturing an apparatus.

DISCLOSURE

Technical Problem

An object of the present invention is to provide a flow-electrode structure, in which a flow-electrode unit is constituted with a channel confined by a liquid-permeable wall or an ion-exchangeable membrane and the multiple channel-type flow-electrode units are arranged in a highly dense manner, such as a lattice shape, while forming a basic frame as a scaffold of supplying an electrolyte, in order to obtain high capacity while reducing manufacturing costs and installation space when applied to large-scale-plants for electricity generation, energy storage, desalinization, etc.

Technical Solution

A first aspect of the present invention provides a channel-type flow-electrode unit comprising: a channel-type liquid-permeable wall confining the structure of the electrode unit as a scaffold; an ion-exchangeable current collector passing a positive ion or a negative ion and having electrical conductivity, which is placed on an inner surface of the liquid-permeable wall; and an electrode flow channel separated from the liquid-permeable wall by the ion-exchangeable current collector, along an inside of which an electrode active material-containing fluid introduced from a channel inlet and discharged to a channel outlet flows.

A second aspect of the present invention provides a channel-type flow-electrode unit comprising: a channel-type liquid-permeable wall confining the structure of the electrode unit as a scaffold; an ion-exchangeable material applied to an inner surface or an outer surface of the channel-type liquid-permeable wall, the liquid-permeable wall itself, or a combined position thereof to allow a positive ion or a negative ion to pass therethrough; a porous current collector applied to an inner surface of the liquid-permeable wall to which the ion-exchange material has been applied; and an electrode flow channel separated from the liquid-permeable wall by the porous current collector, along an inside of which an electrode active material-containing fluid introduced from a channel inlet and discharged to a channel outlet flows.

A third aspect of the present invention provides a channel-type flow-electrode structure having two or more channel-type flow-electrode units of the first or second aspect.

A fourth aspect of the present invention provides a method of manufacturing the channel-type flow-electrode unit of the first or second aspect, comprising: Step 1a of preparing a channel confined by a liquid-permeable wall; Step 2a of applying an ion-exchangeable material passing a positive ion or a negative ion to an inner surface or an outer surface of the channel-type liquid-permeable wall, the channel-type liquid-permeable wall itself, or to a combined position thereof; and Step 3a of applying a porous current collector to an inner surface of the channel-type liquid-permeable wall to which an ion-exchangeable material has been applied.

A fifth aspect of the present invention provides a method of manufacturing the channel-type flow-electrode unit of the first aspect, comprising: Step 1b of preparing a channel confined by a liquid-permeable wall; Step 2b of applying a porous current collector to an inner surface of the channel-type liquid-permeable wall; and Step 3b of applying an ion-exchangeable membrane passing a positive ion or a negative ion to an inner surface of the channel-type liquid-permeable wall to which a porous current collector has been applied.

A sixth aspect of the present invention provides a method of manufacturing the channel-type flow-electrode structure of the third aspect, comprising: Step 1c of preparing an integral scaffold of a liquid-permeable wall forming a basic frame for a plurality of channels, in which a fluid is introduced from an inlet and discharged to an outlet; Step 2c of applying an ion-exchangeable material passing a positive ion to an inner surface of the channel-type liquid-permeable wall of selected channel(s), the channel-type liquid-permeable wall itself, or to a combined position thereof and applying an ion-exchangeable material passing a negative ion to an inner surface of the channel-type liquid-permeable wall of other selected channel(s), the channel-type liquid-permeable itself, or to a combined position thereof; and Step 3c of applying a porous current collector to an inner surface of the the channel-type liquid-permeable wall to which an ion-exchangeable material has been applied.

A seventh aspect of the present invention provides a method of manufacturing the channel-type flow-electrode structure of the third aspect, comprising: Step 1d of preparing an integral scaffold of a liquid-permeable wall forming a basic frame for a plurality of channels, in which a fluid is introduced from an inlet and discharged to an outlet; Step 2d of applying a porous current collector to an inner surface of the channel-type liquid-permeable wall; and Step 3d of coating an ion-exchangeable material passing a positive ion on an inner surface of the channel-type liquid-permeable wall of channel(s) selected from among channels to which the porous current collector has been applied, and coating an ion-exchangeable material passing a negative ion on an inner surface of the channel-type liquid-permeable wall of other channel(s) selected from among channels to which a porous current collector has been applied.

A eighth aspect of the present invention provides a cell equipped with a channel-type flow-electrode structure, comprising: a channel-type flow-cathode unit confined by a channel-type liquid-permeable wall, wherein a cathode ion-exchangeable current collector passing a positive ion and having electrical conductivity is placed on an inner surface of the channel-type liquid-permeable wall; a channel-type flow-anode unit confined by a channel-type liquid-permeable wall, wherein an anode ion-exchangeable current collector passing a negative ion and having electrical conductivity is placed on an inner surface of a channel-type liquid-permeable wall; and an electrode flow channel separated from the liquid-permeable wall by the ion-exchangeable current collector, along an inside of which an electrode active material-containing fluid introduced from a channel inlet and discharged to a channel outlet flows.

A ninth aspect of the present invention provides a cell equipped with a channel-type flow-electrode structure, comprising: a channel-type flow-cathode unit confined by a channel-type liquid-permeable wall, wherein an ion-exchangeable material is applied to an inner surface or an outer surface of the channel-type liquid-permeable wall, the liquid-permeable wall itself, or a combined position thereof to allow a positive ion to pass therethrough and then a porous current collector is applied to an inner surface of the liquid-permeable wall to which the ion-exchangeable material has been applied; a channel-type flow-anode unit confined by a channel-type liquid-permeable wall, wherein an ion-exchangeable material is applied to an inner surface or an outer surface of a channel-type channel-type wall, a channel-type wall itself, or a combined position thereof to allow a negative ion to pass therethrough and then a porous current collector is applied to an inner surface of the channel-type wall to which the ion-exchangeable material has been applied; and an electrode flow channel separated from the liquid-permeable wall by the ion-exchangeable current collector, along an inside of which an electrode active material-containing fluid introduced from a channel inlet and discharged to a channel outlet flows.

A tenth aspect of the present invention provides a channel-type flow-electrode structure, comprising: an ion-exchangeable membrane scaffold which forms a basic frame for a plurality of channels, in which a fluid is introduced from an inlet and discharged to an outlet; a channel-type flow-cathode unit, comprising a porous current collector arranged on an inner surface of channel(s) confined by the ion-exchangeable membrane scaffold, and a cathode flow channel separated from the channel-type ion-exchangeable membrane scaffold by the porous current collector, along an inside of which a cathode active material-containing fluid introduced from a channel inlet and discharged to a channel outlet flows; and a channel-type flow-anode unit, comprising a porous current collector arranged on an inner surface of other channel(s) confined by the ion-exchangeable membrane scaffold, and an anode flow channel separated from the channel-type ion-exchangeable membrane scaffold by the porous current collector, along an inside of which an anode active material-containing fluid introduced from a channel inlet and discharged to a channel outlet flows.

An eleventh aspect of the present invention provides a capacitive flow-electrode device comprising the channel-type flow-electrode structure of the third or tenth aspect.

A twelfth aspect of the present invention provides a redox flow battery device comprising the channel-type flow-electrode structure of the third or tenth aspect.

Hereinafter, the present invention will be described in detail.

In the present invention, the positive electrode refers to a cathode and the negative electrode refers to an anode. The polarity thereof may be changed due to desalinization or electric discharge.

Although a specific mechanism principle is different, the four basic constitutions of a secondary cell, i.e., a battery, a condenser, or a capacitor, are a cathode, an anode, an ion-exchangeable membrane, and an electrolyte. A redox reaction is applied to a battery, and an ion-adsorption theory (electrical double layer, EDL) is applied to a capacitor.

Among the four constituents, an electrolyte (including a reaction catalyst) alone flows in redox flow cell, commonly known as a flow cell.

In the channel-type flow-electrode according to the present invention, an electrode active material does not fluctuate only in a fixed vessel, but has an in-out flow along an inside of a channel. In the case of a capacitive flow-electrode, an electrode active material capable of adsorbing and desorbing ions is used.

Accordingly, FCDI to which the cell having the channel-type flow-electrode according to the present invention can be applied may be a capacitive flow-electrode in light of phenomenon. However, FCDI is characterized in that cathode active materials and anode active materials among the four constituents are simultaneously introduced from an inlet of an electrode flow channel and discharged through an outlet of the electrode flow channel. At this time, an electrolyte may or may not flow along an inside of the flow channel having an inlet/outlet.

On the other hand, a capacitive flow-electrode device 100 that can be used in an electric power plant producing electricity from an electrolyte is described with reference to FIG. 1. In the capacitive flow-electrode device 100, a plate-type flow-cathode 112 and a plate-type flow-anode 114 are arranged on both sides of a plate-type electrolyte flow channel 102, which is centered between the plate-type flow-cathode 112 and the plate-type flow-anode 114. A plate-type cathode ion-exchangeable current collector is arranged between the electrolyte flow channel 102 and the flow-cathode 112, and a plate-type anode ion-exchangeable current collector is arranged between the electrolyte flow channel 102 and the flow-anode 114. In addition, closing plates 116, 118 are arranged on an outer side of the plate-type flow-cathode 112 and an outer side of the plate-type flow-anode 114 so as to form a channel.

As shown in FIG. 1, the cathode ion-exchangeable current collector may be one in which a cathode ion-exchangeable membrane 104 and a porous cathode plate 106 are stacked. The cathode ion-exchangeable membrane 104 is arranged on the side of the electrolyte flow channel 102, and the porous cathode plate 106 is arranged on the side of the flow-cathode 112. In contrast, the cathode ion-exchangeable membrane 104 may be arranged on the side of the flow-cathode 112, and the porous cathode plate 106 may be arranged on the side of the electrolyte flow channel 102.

Additionally, as shown in FIG. 1, the anode ion-exchangeable current collector may be one in which an anode ion-exchangeable membrane 108 and a porous anode plate 110 are stacked. The anode ion-exchangeable membrane 108 is arranged on the side of the electrolyte flow channel 102, and the porous anode plate 110 is arranged on the side of the flow-anode 114. In contrast, the anode ion-exchangeable membrane 108 may be arranged on the side of the flow-anode 114, and the porous anode plate 110 may be arranged on the side of the electrolyte flow channel 102.

The plate-type flow-cathode 112 is a plate-type flow channel in which a cathode active material 111 flows in an electrode solution in a dispersed slurry state. In addition, the plate-type flow-anode 114 is a plate-type flow channel in which an anode active material 113 flows in an electrode solution in a dispersed slurry state. The plate-type flow-cathode 112 and the plate-type flow-anode 114 require closing plates 116, 118 on the outer side and a plate-type scaffold on the inner side in order to form a plate-type flow channel.

The operation principle when the capacitive flow-electrode device 100 is utilized as an electric power plant will be described below. When an electrolyte having positive and negative ions flows through the plate-type electrolyte flow channel 102, positive ions passed through the plate-type cathode ion-exchangeable current collector move into the plate-type flow-cathode 112 and negative ions passed through the anode ion-exchangeable current collector move into the plate-type flow-anode 114. As a result, a potential difference is generated between the flow-cathode 112 and the flow-anode 114. When such potential difference is electrically connected to the outside through the porous cathode plate 106 and the porous anode plate 110, the capacitive flow-electrode device 100 may be utilized as a power generating unit.

On the contrary, when an electric current is externally applied to the porous cathode plate 106 and the porous anode plate 110 to generate a potential difference, positive and negative ions are forcibly moved from the electrolyte flowing through the electrolyte flow channel 102 to the flow-cathode 112 and the flow-anode 114, thereby desalting the electrolyte.

Additionally, since electric charge is filled into slurry flowing along an inside of the flow-cathode 112 and the flow-anode 114 at the same time, the slurry can be stored and utilized as an electric storage device.

The closing plate 116, 118 may be a non-electrically conductive plate or a metal plate having electrical conductivity. If an electrically conductive metal plate is used, it can be utilized as an additional current collector.

In order to obtain high capacity while reducing manufacturing costs and installation space when applied to large-scale-plants for electricity generation, energy storage, desalinization, etc., the present inventors have modified the constitution of the plate-type electrode flow channel shown in FIG. 1, by designing a channel-type flow electrode in the way of eliminating the closing plate and surrounding a channel thereof with a liquid-permeable wall or an ion-exchangeable membrane; and then the present inventors have found that it is possible to provide a channel-type flow-electrode structure in which a plurality of channel-type flow-electrode units are arranged in a highly dense manner, such as a lattice shape and that a liquid-permeable wall or ion-exchangeable membrane can serve as a scaffold supplying an electrolyte while forming a basic frame. The present invention is based on these findings.

Therefore, one of the features of the present invention is to provide a channel-type flow-electrode structure, wherein a basic frame comprising a plurality of channels, in which a fluid is introduced from an inlet and discharged to an outlet, is formed by an integral liquid-permeable wall or ion-exchangeable membrane and then some or all of the channels confined by being surrounded with a liquid-permeable wall or an ion-exchangeable membrane constitute the flow-electrode unit (FIG. 3). In this case, two adjacent channel-type flow-electrode units may share a liquid-permeable wall or ion-exchangeable membrane (FIG. 2).

Additionally, another feature of the present invention is to design the channel-type flow-electrode unit to be assembled in the form of a block (FIG. 3) to provide a channel-type flow-electrode structure comprising at least two channel-type flow-electrode units (FIG. 4).

Additionally, still another feature of the present invention is that the channel-type flow-electrode structure according to the present invention can operate as an electrochemical cell because in the channel-type flow-electrode structure, unlike the capacitive flow-electrode device having the electrode flow channel shown in FIG. 1, an electrolyte can be supplied through a liquid-permeable wall of a channel-type electrode unit even if there is no additional electrolyte flow channel.

The present invention provides a cathode/anode/ion-exchangeable membrane/electrolyte in the capacitive flow-electrode device as the channel-type flow-electrode structure according to the third or tenth aspect of the present invention. The channel-type flow-electrode structure according to the third aspect of the present invention includes at least two channel-type flow-electrode units according to the first or second aspect of the present invention.

The channel-type flow-electrode unit according to the first aspect of the present invention may be a channel-type flow-electrode unit, a scaffold of which is confined by a liquid-permeable wall, wherein an ion-exchangeable current collector passing a positive ion or a negative ion, preferably either a positive ion or a negative ion, and having electrical conductivity is placed on an inner surface of a channel-type wall; and an electrode flow channel, along an inside of which an electrode active material-containing fluid introduced from a channel inlet and discharged to a channel outlet flows, is separated from the wall by the ion-exchangeable current collector.

In particular, when the channel-type flow-electrode unit is provided with a cathode ion-exchangeable current collector passing a positive ion and having electrical conductivity, it may be a channel-type flow-cathode unit; and when the channel-type flow-electrode unit is provided with an anode ion-exchangeable current collector passing a negative ion and having electrical conductivity, it may be a channel-type flow-anode unit (FIG. 5).

In particular, the ion-exchangeable current collector may be produced by an electrically conductive material which only passes ions, and may be one in which an ion-exchangeable membrane and a porous current collector (e.g., carbon, a metal material, and a conductive polymer) are stacked. Herein, the stacking sequence is not significant as long as it acts as an ion-exchangeable current collector.

The cathode-exchangeable membrane may be a dense thin film that prevents the flowing of an electrolytic liquid and selectively only passes a positive ion, and the anode-exchangeable membrane may be a dense thin film that prevents the flowing of an electrolytic liquid and selectively passes only a negative ion. As the cathode-exchangeable membrane and the anode-exchangeable membrane, an ion-exchangeable membrane known in the art may be used.

The channel-type flow-electrode unit according to the second aspect of the present invention may be a channel-type flow-electrode unit, a scaffold of which is confined by a liquid-permeable wall, wherein an ion-exchangeable material is applied (e.g., coated) to an inner surface or an outer surface of a channel-type wall, a channel-type wall itself, or a combined position thereof to allow a positive ion or a negative ion, preferably either a positive ion or a negative ion, to pass therethrough;

a porous current collector is applied to an inner surface of the channel-type wall to which an ion-exchange material has been applied; and an electrode flow channel, along an inside of which an electrode active material-containing fluid introduced from a channel inlet and discharged to a channel outlet flows, is separated from the wall by the porous current collector.

When an ion-exchangeable material passing a positive ion is applied, the channel-type flow-electrode unit may be a channel-type flow-cathode unit; and when an ion-exchangeable material passing a negative ion is applied, the channel-type flow-electrode unit may be a channel-type flow-anode unit.

In the present invention, the cathode active material and anode active material may be a different material, but the same material may be used. In the case where the same material is used for the cathode active material and anode active material, these are designated as electrode active materials. For the cathode active material and the anode active material, porous carbon (activated carbon, carbon fiber, carbon aerogel, carbon nanotube, etc.), graphite powder, metal-oxide powder, etc. may be used.

Additionally, the electrode solution includes an aqueous solution containing electrolyte such as NaCl, $H_2SO_4$, HCl, NaOH, KOH, $Na_2NO_3$, etc., and an organic electrolytic solution such as propylene carbonate (PC), diethyl carbonate (DEC), and tetrahydrofuran (THF). In particular, salt water containing a large amount of salt (particularly, NaCl) or freshwater containing a trace amount of salt may be used as the electrode solution.

The porous current collector may be a material through which a fluid passes while being electrically conductive. For example, the porous current collector may be porous carbon or conductive polymer. The porous carbon may be produced by using graphite, graphene, carbon fiber, activated carbon, carbon nanotube, etc.

Similar to the electrode solution, the electrolyte may includes an aqueous solution containing NaCl, $H_2SO_4$, HCl, NaOH, KOH, $Na_2NO_3$, etc., and an organic electrolytic solution such as propylene carbonate (PC), diethyl carbonate (DEC), and tetrahydrofuran (THF). In particular, salt water containing a large amount of salt (particularly, NaCl) or freshwater containing a trace amount of salt may be used as the electrolyte.

The liquid-permeable wall may serve as a frame scaffold. The channel confined by being surrounded with the liquid-permeable wall may be in a shape of a polygonal column, e.g., a rectangular column, as shown in FIG. 3, or may be in a shape of a cylinder.

It is preferable that the liquid-permeable wall is electrically insulated. The material of the liquid-permeable wall may include a zeolite, a ceramic, or a polymeric material, and the liquid-permeable is preferably comprised of fibrous tissues so that an electrolyte can easily move.

In the present invention, the ion-exchangeable membrane acting as the liquid-permeable wall may be a pore-filled membrane in which a porous scaffold is coated with an ion-permeable material.

As illustrated in FIG. 8, the channel-type flow-electrode unit of the present invention can be provided by the following method, comprising:

Step 1*a* of preparing a channel confined by a liquid-permeable wall;

Step 2*a* of applying an ion-exchangeable material passing a positive ion or a negative ion, preferably either a positive ion or a negative ion, to an inner surface or outer surface of the channel-type liquid-permeable wall, the channel-type liquid-permeable wall itself, or to a combined position thereof; and Step 3*a* of applying a porous current collector to an inner surface of the channel-type liquid-permeable wall to which an ion-exchangeable material has been applied.

Additionally, the channel-type flow-electrode unit of the present invention can be provided by the following method, comprising:

Step 1*b* of preparing a channel confined by a liquid-permeable wall;

Step 2*b* of applying a porous current collector to an inner surface of the channel-type liquid-permeable wall; and Step 3*b* of applying an ion-exchangeable membrane passing a positive ion or a negative ion, preferably either a positive ion or a negative ion, to an inner surface of the channel-type liquid-permeable wall to which a porous current collector has been applied.

On the other hand, the channel-type flow-electrode structure according to the third aspect of the present invention may be one in which channel-type flow-electrode units in the form of a block are assembled. Additionally, the channel-type flow-electrode structure according to the third aspect of the present invention may be one, in which a basic frame comprising a plurality of channels in which a fluid is introduced from an inlet and discharged to an outlet is formed by an integral liquid-permeable wall and then some or all of the channels confined by the liquid-permeable wall constitute the flow-electrode unit.

The channel-type flow-electrode structure according to the present invention may further include an electrolyte flow channel. The electrolyte flow channel may continuously supply an electrolyte. In particular, the electrolyte flow channel may be a channel-type confined by being surrounded with a liquid-permeable wall. The shape and position of the channel-type electrolyte flow channel (refer to empty spaces in FIG. 9; a hatched mark in FIG. 10; and black circles in FIG. 11) are not limited as long as the electrolyte flow channel is disposed to be adjacent to both at least one channel-type flow-cathode unit and at least one channel-type flow-anode unit so as to supply an electrolyte to both channel-type flow-cathode unit and channel-type flow-anode unit.

When there exists a separate electrolyte flow channel, the liquid-permeable wall acts primarily as a structural scaffold for a transport of ions, and the transport of an electrolyte is mainly carried out along an inside of the electrolyte flow channel.

The direction of the movement of an electrolyte in the electrolyte flow channel and that of a fluid in the channel-type flow-cathode unit and the channel-type flow-anode unit may be the same or opposite.

In the case where there is no electrolyte flow channel, the channel-type flow-electrode structure according to the present invention may be formed using only the channel-type flow-cathode unit and the channel-type flow-anode unit.

An electrolyte may be supplied through a separate channel-type flow channel for the electrolyte, a liquid-permeable wall, or through both. In addition, with reference to the channel, an electrolyte may be supplied in a longitudinal direction of the channel, a lateral direction of the channel, or in both.

In the liquid-permeable wall, a part of the liquid-permeable wall may be contained in an electrolytic solution to naturally move an electrolyte by gravity or capillary phenomenon, or an electrolyte which is forcibly flowed in the electrolyte flow channel may flow while permeating into the liquid-permeable wall.

In the channel-type flow-electrode structure according to the present invention, various types and arrangements of the channel-type flow-cathode unit, the channel-type flow-anode unit, and the channel-type electrolyte flow unit are possible according to the intention of a designer. Further, as long as an electrode active material is continuously supplied into the channel-type flow-electrode structure of the present invention, desalination and electricity generation may continuously occur due to infinite adsorption capacity thereof (FIGS. 9 and 10).

For example, the channel-type flow-cathode unit and the channel-type flow-anode unit may be in the form of facing each other adjacent to both sides of the electrolyte flow channel, and at the same time, the channel-type flow-cathode unit and the channel-type flow-anode unit may be arranged in a diagonal direction. In addition, the electrolyte flow channels may be arranged in a diagonal direction.

An electrochemical cell can be formed by supplying an electrolyte through the liquid-permeable wall in the channel-type flow-electrode structure of the present invention, which is equipped with at least one channel-type flow-cathode unit and at least one channel-type flow-anode unit.

In the present invention, the expression "electrochemical" includes an oxidation-reduction (redox) reaction as well as an adsorption-desorption reaction of ions.

In order to form an electrochemical cell using the channel-type flow-electrode structure according to the present invention, there is preferably at least one interaction between the channel-type flow-cathode unit and the channel-type flow-anode unit, which are adjacent to each other. The electrochemical interaction therebetween can occur not only by a case where the channel-type flow-cathode unit and the channel-type flow-anode unit are directly adjacent to each other, but also by a case where the channel-type flow-cathode unit and the channel-type flow-anode unit are adjacent to each other with the electrolyte flow channel therebetween.

The operation principle of the electrochemical cell in the channel-type flow-electrode structure according to the present invention is shown in FIGS. 5 and 6.

As shown in FIG. 5a, the channel-type flow-electrode structure according to the present invention has the same operation principle as in FIG. 1. However, unlike the capacitive flow-electrode device having the plate-type electricity flow channel shown in FIG. 1, in the channel-type flow-electrode structure according to the present invention, an electrolyte can be supplied by the liquid-permeable wall of the channel-type electrode unit even when there is no additional electrolyte flow channel, and thereby the channel-type flow-electrode structure according to the present invention can be operated as an electrochemical cell (FIG. 7). Additionally, in the channel-type flow-electrode structure according to the present invention, the movement of positive and negative ions occurs in the entire wall surface of the liquid-permeable wall surrounding the electrode flow channel, and thus the travel distance of negative and positive ions in the electrode flow channel is short, unlike a plate-type flow-electrode. As a result, the adsorption/desorption rate of the electrode active material, as well as the charge/discharge efficiency, is high and the capacity of the flow-electrode device 200 can be greatly increased.

When a voltage is applied to the porous current collector, each of the cathode active material and the anode active material flowing along an inside of the channel is charged, which causes the electrolyte to be separated into the positive and negative ions, while passing through the ion-exchangeable membrane and the channel-type wall and adsorbing to the charged active material, and as a result, desalinization occurs. Meanwhile, the electricity can be generated in the electrode active material through ion adsorption or desorption and then electricity can be collected.

As shown in FIG. 7, the channel-type flow-electrode structure according to the present invention has no separate electrolyte flow channel, but a liquid-permeable wall may substitute the same. Therefore, the channel-type flow-electrode structure according to the present invention has an advantage in that the size of the capacitive flow-electrode device can be further reduced.

The channel-type flow-electrode structure of the present invention can be provided by the following method, comprising:

Step 1c of preparing an integral scaffold of a liquid-permeable wall forming a basic frame for a plurality of channels, in which a fluid is introduced from an inlet and discharged to an outlet;

Step 2c of applying an ion-exchangeable material passing a positive ion to an inner surface of the channel-type liquid-permeable wall of selected channel(s), the channel-type liquid-permeable wall itself, or to a combined position thereof and applying an ion-exchangeable material passing a negative ion to an inner surface of the channel-type liquid-permeable wall of other selected channel(s), the channel-type liquid-permeable itself, or to a combined position thereof; and Step 3c of applying a porous current collector to an inner surface of the the channel-type liquid-permeable wall to which an ion-exchangeable material has been applied.

Additionally, the channel-type flow-electrode structure of the present invention can be provided by the following method, comprising:

Step 1d of preparing an integral scaffold of a liquid-permeable wall forming a basic frame for a plurality of channels, in which a fluid is introduced from an inlet and discharged to an outlet;

Step 2d of applying a porous current collector to an inner surface of the channel-type liquid-permeable wall; and Step 3d of coating an ion-exchangeable material passing a positive ion on an inner surface of the channel-type liquid-permeable wall of channel(s) selected from among channels to which the porous current collector has been applied, and coating an ion-exchangeable material passing a negative ion on an inner surface of the channel-type liquid-permeable wall of other channel(s) selected from among channels to which a porous current collector has been applied.

On the other hand, the cell having the channel-type flow-electrode according to the eighth aspect of the present invention may be a cell having a channel-type flow-electrode, comprising:

a channel-type flow-cathode unit confined by a channel-type liquid-permeable wall, wherein a cathode ion-exchangeable current collector passing a positive ion and having electrical conductivity is placed on an inner surface of the channel-type liquid-permeable wall;

a channel-type flow-anode unit confined by a channel-type liquid-permeable wall, wherein an anode ion-exchangeable current collector passing a negative ion and having electrical conductivity is placed on an inner surface of a channel-type liquid-permeable wall; and an electrode flow channel separated from the liquid-permeable wall by the ion-exchangeable current collector, along an inside of which an electrode active material-containing fluid introduced from a channel inlet and discharged to a channel outlet flows.

Additionally, the cell having the channel-type flow-electrode according to the ninth aspect of the present invention may be a cell having a channel-type flow-electrode, comprising:

a channel-type flow-cathode unit confined by a channel-type liquid-permeable wall, wherein an ion-exchangeable material is applied to an inner surface or an outer surface of the channel-type liquid-permeable wall, the liquid-permeable wall itself, or a combined position thereof to allow a positive ion to pass therethrough and then a porous current collector is applied to an inner surface of the liquid-permeable wall to which the ion-exchangeable material has been applied;

a channel-type flow-anode unit confined by a channel-type liquid-permeable wall, wherein an ion-exchangeable material is applied to an inner surface or an outer surface of a channel-type channel-type wall, a channel-type wall itself, or a combined position thereof to allow a negative ion to pass therethrough and then a porous current collector is applied to an inner surface of the channel-type wall to which the ion-exchangeable material has been applied; and an electrode flow channel separated from the liquid-permeable wall by the ion-exchangeable current collector, along an inside of which an electrode active material-containing fluid introduced from a channel inlet and discharged to a channel outlet flows.

An electrochemical cell can be formed by supplying an electrolyte through the liquid-permeable wall in cell equipped with a channel-type flow-electrode structure according to the eighth or ninth aspect of the present invention, which is equipped with at least one channel-type flow-cathode unit and at least one channel-type flow-anode unit. Here, the channel-type flow-cathode unit and the channel-type flow-anode unit may share an adjacent wall (FIG. 7).

As shown in FIG. 12, a redox flow-electrode device 120 is equipped with a cathode flow channel 126, an anode flow channel 128, and an ion-exchangeable membrane 130 therebetween. An electrode solution flows along an inside of the cathode flow channel 126 and the anode flow channel 128, respectively. In addition, a cathode current collector 122 and an anode current collector 124, which collect electricity, are arranged on the cathode flow channel 126 and the anode flow channel 128, respectively.

A cathode solution stored in a cathode solution tank 132 is circulated along the cathode flow channel 126 by a cathode pump 134; and an anode solution stored in an anode solution tank 136 is circulated along the anode flow channel 128 by an anode pump 138. As the cathode solution and anode solution, an electrolytic solution containing zinc ion and bromide ion is generally used.

Therefore, electricity is generated or stored while an oxidation-reduction reaction occurs between the cathode flow channel 126 and the anode flow channel 128, which are separated by the ion-exchangeable membrane 130.

The redox flow-electrode device of present invention provides a cathode/anode/ion-exchangeable membrane/electrolyte as the channel-type flow-electrode structure according to the third or tenth aspect of the present invention.

The channel-type flow-electrode structure according to the tenth aspect of the present invention is a channel-type flow-electrode structure, in which a part of the channel-type flow-electrode unit according to the first or second aspect of the present invention is partially modified such that an ion-exchangeable membrane, which is applied instead of a liquid-permeable wall, functions as a channel-type frame scaffold.

In particular, the ion-exchangeable membrane is an electrically insulating film capable of freely passing ions, and it physically separates between a cathode and an anode.

The channel-type flow-electrode structure according to the tenth aspect of the present invention may include:

an ion-exchangeable membrane scaffold which forms a basic frame for a plurality of channels, in which a fluid is introduced from an inlet and discharged to an outlet;

a channel-type flow-cathode unit, comprising a porous current collector arranged on an inner surface of channel(s) confined by the ion-exchangeable membrane scaffold, and a cathode flow channel separated from the channel-type ion-exchangeable membrane scaffold by the porous current collector, along an inside of which a cathode active material-containing fluid introduced from a channel inlet and discharged to a channel outlet flows; and a channel-type flow-anode unit, comprising a porous current collector arranged on an inner surface of other channel(s) confined by the ion-exchangeable membrane scaffold, and an anode flow channel separated from the channel-type ion-exchangeable membrane scaffold by the porous current collector, along an inside of which an anode active material-containing fluid introduced from a channel inlet and discharged to a channel outlet flows.

In order to operate as an electrochemical cell, the channel-type flow-anode unit is arranged in the vicinity of the channel-type flow-cathode unit.

The ion-exchangeable membrane scaffold may be a pore-filled membrane in which a porous scaffold is coated with an ion-permeable material that selectively permeates protons.

The porous current collector may be arranged to be in contact with an inner wall of the channel formed by the ion-exchangeable membrane scaffold. Therefore, the cathode flow channel along an inside of which a cathode active material-containing fluid flows is separated from the ion-exchangeable membrane scaffold by the porous current collector; and the anode flow channel along an inside of which an anode active material-containing fluid flows is separated from the ion-exchangeable membrane scaffold by the porous current collector.

The cathode active material and the anode active material used herein may be the same or different materials.

Additionally, the channel-type flow-electrode structure according to the tenth aspect of the present invention may further include an electrolyte flow channel, and the electrolyte flow channel may be confined by the ion-exchangeable membrane.

As shown in FIG. 13, the redox flow-electrode device 418 using the channel-type flow-electrode structure according to the tenth aspect of the present invention may include an ion-exchangeable membrane scaffold 402 passing only protons; and a flow-cathode channel 401 and flow-anode channel 403, formed in an inner side of the channel-type ion-exchangeable membrane scaffold 402. As shown in FIG. 13, the flow-cathode channel 401 and the flow-anode channel 403 may be arranged in a check pattern. Here, protons move through the ion-exchangeable membrane scaffold 402, and thus the redox reactions between the cathode active material-containing fluid and anode active material-containing fluid occur in the flow-cathode channel 401 and the flow-anode channel 403, respectively. Accordingly, charging or discharging occurs.

The lattice-type capacitive desalination cell according to an exemplary embodiment of the present invention may be operated in a batch mode as shown in FIG. 17, or in a continuous mode in which the supplied saline water is desalted and flows out.

The desalination occurs mainly in a desalination site (a middle channel in the 1×3 cell) positioned between the positive and negative ions-exchangeable membrane-coated channels. If the number of channels increased from 3 to 9, the four individual sites may serve as desalination sites. That is, the volume of the entire system (3×3 cell) is increased by three times, whereas the volume of the desalination site is increased by four times of the 1×3 cell. Accordingly, as the size of the cell expands, the number of the desalination sites rapidly increases, thereby significantly increasing the capacity of removing salts. Furthermore, in the case of the lattice-type cell, the increase in the number of channels does not cause an increase in pressure, which is one of the problems of the series-type FCDI stack.

Advantageous Effects

The channel-type flow-electrode structure according to the present invention including at least two channel-type flow-electrode units, can significantly reduce manufacturing costs and installation space by reducing the number of module parts while extending the electrode capacity to be suitable for large-scale plants for electricity generation, energy storage, desalination, etc. In addition, the channel-type flow-electrode structure can not only be applied to a capacitive flow-electrode device and/or a redox flow-electrode device, but also to all of the devices for electricity generation, energy storage, and desalination while moving ions or protons.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a schematic diagram of a plate-type capacitive flow-electrode device, from which the basic frame and operation principle of the present invention is derived.

FIG. 2 is a schematic diagram of a channel-type flow-electrode structure integrally provided with two or more channel-type flow-electrode units according to an exemplary embodiment of the present invention.

FIG. 3 is schematic diagrams of the channel-type flow-cathode unit and the channel-type flow-anode unit according to an exemplary embodiment of the present invention.

FIG. 4 is a schematic diagram of a channel-type flow-electrode structure, in which two or more channel-type flow-electrode units are assembled according to an exemplary embodiment of the present invention.

FIG. 5a is schematic diagrams showing the distribution and flow of positive and negative ions in the flows of an electrode active material and an electrolyte at each channel when a separate electrolyte flow channel is present between the channel-type flow-cathode unit and the channel-type flow-anode unit according to an exemplary embodiment of the present invention.

FIG. 5b is a cross-sectional diagram of the channel-type flow-electrode structure when a separate electrolyte flow channel is present between the channel-type flow-cathode unit and the channel-type flow-anode unit according to an exemplary embodiment of the present invention.

FIG. 6 is a schematic diagram showing the operation principle of the channel-type flow-electrode structure when an electrolyte flow channel is arranged between the channel-type flow-cathode unit and the channel-type flow-anode unit according to an exemplary embodiment of the present invention.

FIG. 7 is a schematic diagram showing the flow of an electrolyte through the liquid-permeable wall when a separate electrolyte flow channel is not present between the channel-type flow-cathode unit and the channel-type flow-anode unit according to an exemplary embodiment of the present invention.

FIG. 8 is a schematic diagram showing a method of producing three channel-type flow-electrode structures of Example 1.

FIG. 9 is an arrangement of the channel-type flow-cathode unit and the channel-type flow-anode unit in the channel-type flow-electrode structure according to an exemplary embodiment of the present invention.

FIG. 10 is an arrangement of each channel in the channel-type flow-electrode structure having the channel-type electrolyte flow channel (marked with hatched lines) according to an exemplary embodiment of the present invention.

FIG. 11 is schematic diagrams of the channel-type flow-electrode structures having the electrolyte flow channels (marked with black circles) according to various exemplary embodiments of the present invention.

FIG. 12 is a schematic diagram showing the structure of a general redox flow battery.

FIG. 13 is a schematic diagram of the redox flow-electrode device according to an exemplary embodiment of the present invention.

FIG. 14 is a graph showing a change in current values according to a reaction time using the three channel-type flow-electrode structures produced in Example 1.

FIG. 15 is a graph showing a change in current values according to a reaction time using the nine channel-type flow-electrode structures manufactured in Example 2.

FIG. 16 is schematic diagrams of the lattice-type capacitive desalination cell according to an exemplary embodiment of the present invention ((a) top view (1×3-channel cell); (b) 3×3-channel cell; (c) desalination process).

FIG. 17 shows (a) the constitution of the lattice-type capacitive desalination cell operated in a batch mode and (b) the change in the salt concentration thereof according to an exemplary embodiment of the present invention.

DETAILED DESCRIPTION OF THE EMBODIMENT

Hereinbelow, the present invention will be described in detail with accompanying exemplary embodiments. However, the exemplary embodiments disclosed herein are only for illustrative purposes and should not be construed as limiting the scope of the present invention.

Example 1

Three Channel-Type Flow-Electrode Structures

A channel-type electrode structure having three channels was manufactured as shown in FIG. 8.

Specifically, three-square-column-type channel scaffold was molded to prepare a liquid-permeable microporous honeycomb structure. The first square column channel was coated with a positive ion-exchangeable membrane, and the third square column channel was coated with a negative ion-exchangeable membrane. Thus, the positive ion-exchangeable membrane and the negative-exchangeable membrane respectively were formed on an inner wall surface of the channels. Additionally, graphene was coated on the inner wall surfaces of the first square column channel and third square column channel, which had been coated with the ion-exchangeable membranes, to form a porous current collector.

Therefore, a channel-type flow-electrode structure, in which the first square column channel provides a cathode flow channel along an inside of which a fluid containing a cathode active material flows, the second square column channel provides a electrolyte flow channel, and the third square column channel provides an anode flow channel along an inside of which a flow containing an anode active material flows, was prepared.

On the other hand, activated carbons were used for the cathode active material and the anode active material, and the cathode active material-containing fluid and the anode active material-containing fluid were prepared by adding activated carbon (10 wt %) and 0.1 M NaCl to water.

The cell prepared as described above was placed in a vessel containing saline solution (35 g/L), and a reaction was initiated. The amount of NaCl in the saline solution can be estimated by measuring the conductivity of the saline solution. The conductivity of the initial saline solution (35 g/L) without a desalination reaction was 55 mS/cm, but the conductivity thereof after the desalination reaction was decreased to 37 mS/cm. As a result, the concentration of the saline solution was estimated to be 23.5 g/L.

As shown in FIG. 14, the three channel-type flow-electrode structure manufactured in Example 1 have their salt removal efficiency as about 33%, and thereby this can be operated as desalination devices.

Example 2

Nine Channel-Type Flow-Electrode Structures

Nine channel-type flow-electrode structures as shown in FIG. 5a was manufactured in the same manner as in Example 1.

Additionally, the result of the experiment conducted in the same manner as in Example 1 is shown in Table 1 and FIG. 15.

The prepared cell was placed in a vessel containing saline solution (35 g/L), and a reaction was initiated. The amount of NaCl in the saline solution can be estimated by measuring the conductivity of the saline solution. In the case of the three-channel type cells, the conductivity of the initial saline solution (35 g/L) without a desalination reaction was 62 mS/cm, but the conductivity thereof after the desalination reaction was decreased to 50 mS/cm. As a result, the concentration of the saline solution was estimated to be 28 g/L, and the salt removal efficiency was 20%. When the cell was expanded to have nine channels, the conductivity was reduced to 8.15 mS/cm; the concentration of the saline solution was 8.1 g/L; and the salt removal efficiency was 87%.

TABLE 1

|  | Conductivity (mS/cm) | Salt Concentration (g/L) | Salt Removal Efficiency (%) |
|---|---|---|---|
| Pristine | 62 | 35 |  |
| Desalinated (3 Cell Type) | 50 | 28 | 20 |
| Desalinated (9 Cell Type) | 8.15 | 8.1 | 87 |

Operating Condition: @ 1.2 V for 90 min 3.5 mL

Example 3

Measurement of Desalination Parameters of 1×3 Cell and 3×3 Cell in Batch Mode

As described in a literature (i.e., A novel three-dimensional desalination system utilizing honeycomb-shaped lattice structures for flow-electrode capacitive deionization, *Energy Environ. Sci.*, 2017, 10, 1746 to 1750), a desalination experiment was conducted in the batch mode of FIG. 17, and the literature above is included in the present invention.

The dimensions of lattice structures were 3 mm in width, 0.5 mm in wall thickness, and 120 mm in height. The cordierite was used to form porous channels with the size ranging from 10 μm to 30 μm, and an ion-exchangeable membrane was coated on its surface. On the top thereof, about 30 μm of a graphene layer was coated to serve as a conducting current collector. The prepared cell was immersed in the chamber containing saline solution (35 g/L), and then the desalination experiment was conducted in the batch mode. The salt removal efficiency was calculated by the equation below. The result of the experiment is shown in Table 2.

TABLE 2

| | Current after 100 min (mA) | Current density after 100 min (A/m$^2$) | Salt removal capacity (μmol/min) | Desalination efficiency after 100 min (%) |
|---|---|---|---|---|
| 1 × 3 cell | 5.8 | 17.6 | 9 | 5.6 |
| 3 × 3 cell | 21.1 | 15.9 | 33 | 18.3 |

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

DESCRIPTION OF REFERENCE NUMERALS

100,200,418: Flow-electrode device
102,216,416: Electrolyte flow channel
104,204: Cathode ion-exchangeable membrane
106,206: Porous cathode plate
108,208: Anode ion-exchangeable membrane
110,210: Porous anode plate
111: Cathode active material
112,201,401: Flow-cathode
113: Anode active material
114,203,403: Flow-anode
116,118: Closing plate
202,402: Scaffold
212,214,412,414: Electrode solution

The invention claimed is:

1. A channel-type flow-electrode structure comprising at least two channel-type flow-electrode units;
wherein the two adjacent channel-type flow-electrode units share an integral liquid-permeable wall;
wherein a basic frame comprising a plurality of channels, in which a fluid is introduced from an inlet and discharged to an outlet, is formed by said liquid-permeable wall and then some or all of the channels confined by the liquid-permeable wall constitute the flow-electrode unit; and
wherein said channel-type flow-electrode unit comprises:
a channel-type liquid-permeable wall confining a structure of the electrode unit as a scaffold;
an ion-exchangeable current collector passing a positive ion or a negative ion and having electrical conductivity, which is placed on an inner surface of the liquid-permeable wall; and
an electrode flow channel separated from the liquid-permeable wall by the ion-exchangeable current collector, along an inside of which an electrode active material-containing fluid introduced from a channel inlet and discharged to a channel outlet flows.

2. A channel-type flow-electrode unit structure comprising at least two channel-type flow-electrode units;
wherein the two adjacent channel-type flow-electrode units share an integral liquid-permeable wall;
wherein a basic frame comprising a plurality of channels, in which a fluid is introduced from an inlet and discharged to an outlet, is formed by said liquid-permeable wall and then some or all of the channels confined by the liquid-permeable wall constitute the flow-electrode unit; and
wherein said channel-type flow-electrode unit comprises:
a channel-type liquid-permeable wall confining a structure of the electrode unit as a scaffold;
an ion-exchangeable material applied to an inner surface or an outer surface of the channel-type liquid-permeable wall, the liquid-permeable wall itself, or a combined position thereof to allow a positive ion or a negative ion to pass therethrough;
a porous current collector applied to an inner surface of the liquid-permeable wall to which the ion-exchange material has been applied; and
an electrode flow channel separated from the liquid-permeable wall by the porous current collector, along an inside of which an electrode active material-containing fluid introduced from a channel inlet and discharged to a channel outlet flows.

3. The channel-type flow-electrode structure of claim 1, wherein the ion-exchangeable current collector is formed by stacking an ion-exchangeable membrane and a porous current collector.

4. The channel-type flow-electrode structure of claim 1, wherein the channel-type flow-electrode units are assembled in the form of a block.

5. The channel-type flow-electrode structure of claim 2, wherein the channel-type flow-electrode units are assembled in the form of a block.

6. The channel-type flow-electrode structure of claim 1, further comprising an electrolyte flow channel.

7. The channel-type flow-electrode structure of claim 2, further comprising an electrolyte flow channel.

8. The channel-type flow-electrode structure of claim 1, wherein an electrolyte is supplied through a separate channel-type flow channel for the electrolyte, a liquid-permeable wall, or through both; and
with reference to the channel, the electrolyte is supplied in a longitudinal direction of the channel, a lateral direction of the channel, or in both directions.

9. The channel-type flow-electrode structure of claim 2, wherein an electrolyte is supplied through a separate channel-type flow channel for the electrolyte, a liquid-permeable wall, or through both; and
with reference to the channel, the electrolyte is supplied in a longitudinal direction of the channel, a lateral direction of the channel, or in both directions.

10. A cell equipped with a channel-type flow-electrode structure of claim 1, comprising:
a channel-type flow-cathode unit confined by a channel-type liquid-permeable wall, wherein a cathode ion-exchangeable current collector passing a positive ion and having electrical conductivity is placed on an inner surface of the channel-type liquid-permeable wall;
a channel-type flow-anode unit confined by a channel-type liquid-permeable wall, wherein an anode ion-exchangeable current collector passing a negative ion and having electrical conductivity is placed on an inner surface of a channel-type liquid-permeable wall; and an electrode flow channel separated from the liquid-permeable wall by the ion-exchangeable current collector, along an inside of which an electrode active material-containing fluid introduced from a channel inlet and discharged to a channel outlet flows.

11. A cell equipped with a channel-type flow-electrode structure of claim 2, comprising:

a channel-type flow-cathode unit confined by a channel-type liquid-permeable wall, wherein an ion-exchangeable material is applied to an inner surface or an outer surface of the channel-type liquid-permeable wall, the liquid-permeable wall itself, or a combined position thereof to allow a positive ion to pass therethrough and then a porous current collector is applied to an inner surface of the liquid-permeable wall to which the ion-exchangeable material has been applied;

a channel-type flow-anode unit confined by a channel-type liquid-permeable wall, wherein an ion-exchangeable material is applied to an inner surface or an outer surface of a channel-type channel-type wall, a channel-type wall itself, or a combined position thereof to allow a negative ion to pass therethrough and then a porous current collector is applied to an inner surface of the channel-type wall to which the ion-exchangeable material has been applied; and an electrode flow channel separated from the liquid-permeable wall by the ion-exchangeable current collector, along an inside of which an electrode active material-containing fluid introduced from a channel inlet and discharged to a channel outlet flows.

12. A channel-type flow-electrode structure, comprising:

an ion-exchangeable membrane scaffold which forms a basic frame for a plurality of channels, in which a fluid is introduced from an inlet and discharged to an outlet;

the channel-type flow-cathode unit of claim 2, comprising:

a porous cathode plate arranged on an inner surface of channel(s) confined by the ion-exchangeable membrane scaffold, and a cathode flow channel separated from the channel-type ion-exchangeable membrane scaffold by the porous cathode plate, along an inside of which a cathode active material-containing fluid introduced from a channel inlet and discharged to a channel outlet flows; and the channel-type flow-anode unit of claim 2, comprising:

a porous anode plate arranged on an inner surface of other channel(s) confined by the ion-exchangeable membrane scaffold, and an anode flow channel separated from the channel-type ion-exchangeable membrane scaffold by the porous anode plate, along an inside of which an anode active material-containing fluid introduced from a channel inlet and discharged to a channel outlet flows.

13. A capacitive flow-electrode device comprising the channel-type flow-electrode structure of claim 12.

14. A redox flow battery device comprising the channel-type flow-electrode structure of claim 12.

* * * * *